Jan. 24, 1928. 1,657,118
W. L. FOSTER
DRIVING SIGNAL FOR AUTOMOBILES
Filed June 14, 1926 2 Sheets-Sheet 1
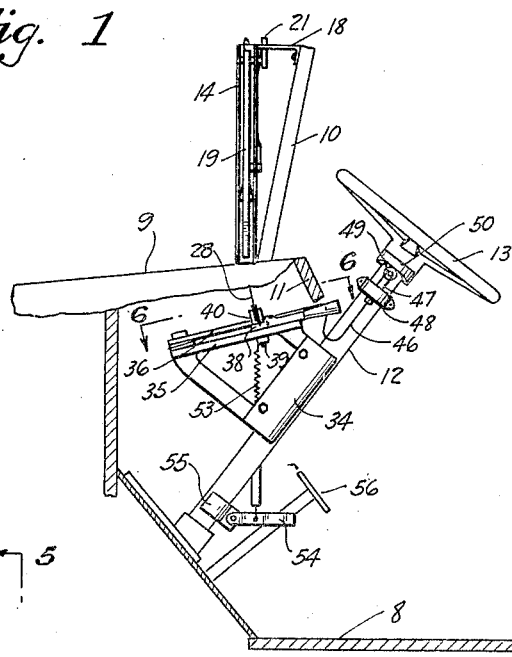
Fig. 1
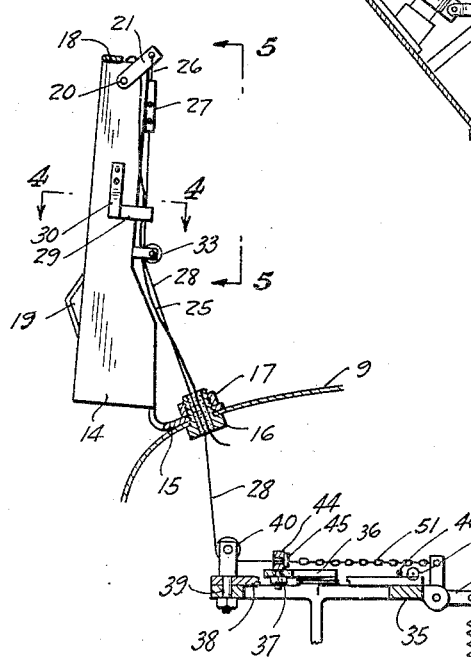
Fig. 2
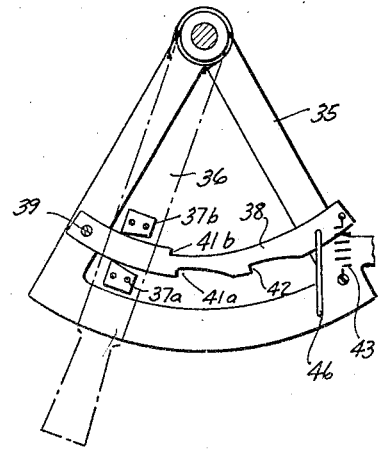
Fig. 8
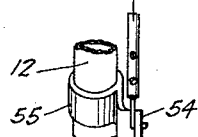
INVENTOR.
Walter L. Foster
BY Nuttall and Wallace
ATTORNEYS.

Jan. 24, 1928.
W. L. FOSTER
1,657,118
DRIVING SIGNAL FOR AUTOMOBILES
Filed June 14, 1926   2 Sheets-Sheet 2
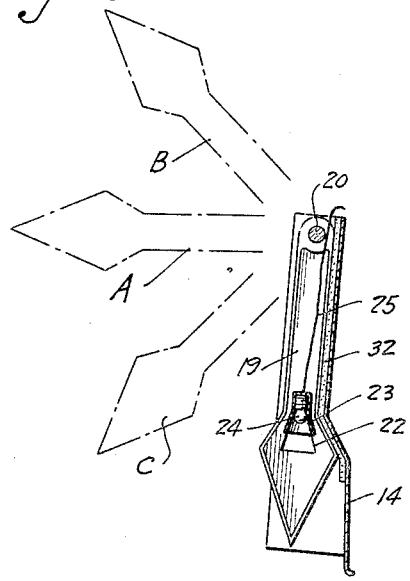
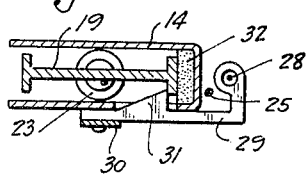
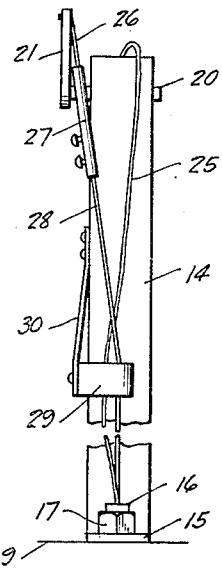
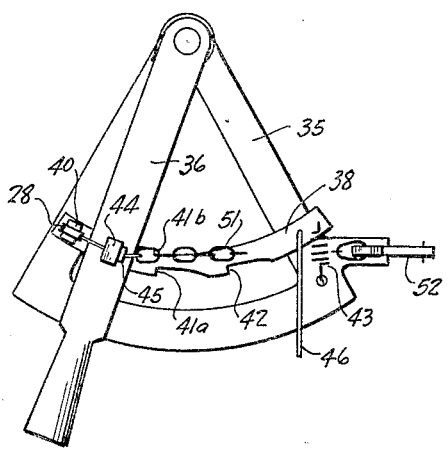
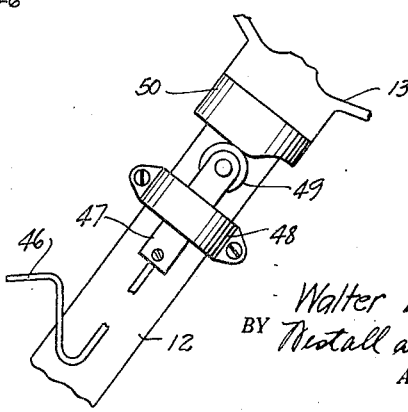
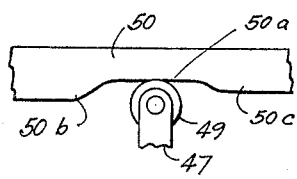
INVENTOR.
Walter L. Foster
BY Nesdall and Wallace
ATTORNEYS.

Patented Jan. 24, 1928.

1,657,118

UNITED STATES PATENT OFFICE.

WALTER L. FOSTER, OF WHITTIER, CALIFORNIA.

DRIVING SIGNAL FOR AUTOMOBILES.

Application filed June 14, 1926. Serial No. 115,805.

This invention relates to a device for signalling travel changes of a vehicle. It is the usual custom and a common legal requirement for the driver of a vehicle to signal his intention to turn, slow down, or stop. In some instances, the driver of a vehicle is so located that an instrumentality of some kind is necessary for signalling and in nearly all cases it is convenient to have such a device. Mechanical and electrical devices have been employed in addition to manual signalling.

The present invention has for its primary object the provision of a mechanically actuated signal which may be initially set to indicate turning and is automatically released to neutral position by action of the driver in fulfilling his intention of turning. Another object of this invention is to provide a construction such that the signal is actuated by operation of the brake pedal to indicate a decrease in speed or a stop. A further object of this invention is to provide a single semaphore arm for making all signals, and to so arrange the same that it may be illuminated at night. A still further object of this invention is to provide a signal of the character described which the operator after setting may release, if he so desires.

In addition to the broader objects of this invention, there are certain details of construction whereby a simple, compact device easily installed upon vehicles without mutilation thereof is obtained, and one which lends itself to economical manufacture. These objects together with other objects and corresponding accomplishments are obtained by means of the embodiment of my invention illustrated in the accompanying drawing, in which:

Fig. 1 is a longitudinal section through the body of an automobile showing a fragment of the front end, my improved signal being shown thereon; Fig. 2 is a section transverse of the body, a fragment thereof being shown; Fig. 3 is a section through the semaphore arm housing showing the arm; Fig. 4 is a section as seen on the line 4—4 of Fig. 2; Fig. 5 is a side elevation looking in the direction of the arrows 5—5 of Fig. 2; Fig. 6 is a view in plan looking in the direction of the arrows 6 of Fig. 1; Fig. 7 is an enlarged fragmental view of the steering column and the signal parts mounted thereon; Fig. 8 is a skeleton view similar to Fig. 6 showing the latch; and Fig. 9 is a diagrammatic view of the steering wheel cam and follower.

Referring with more particularity to the drawing, the body of the automobile is indicated by 8, it being provided with a cowl 9. Mounted upon the cowl is a windshield standard 10, and 11 indicates a dash-board. This construction is shown merely for illustrative purposes and to indicate one type of mounting for the signal. The invention is in no way limited to this particular construction and may be varied to suit the particular body structure, as will be apparent. The automobile is equipped with a steering column 12 having a wheel 13 of the usual construction to provide a travel control mechanism. The device comprises a semaphore arm which may be swung into horizontal position to indicate a turn of the vehicle about that side or the inside of the turn, upwardly at an angle to indicate a turn in the opposite direction and downwardly at an angle to indicate slowing down or stoppage.

The semaphore arm is mounted within the housing at one of the windshield standards; in this specific instance, on the left hand side. This provides a position such that the semaphore arm when projected will be visible from both the front and rear of the vehicle. A housing 14 for the arm is of channel form having a foot 15 at the lower end whereby it may be secured to the cowl. The foot is provided with an opening through which a bushing 16 is extended, the bushing being locked in position and holding the foot by means of a nut 17. The bore through the bushing provides for passage of an operating line which operates the signal. The upper end of the housing may be anchored to the standard by means of the brace 18. Pivotally mounted so that it may be disposed within the housing is a semaphore arm 19. Obviously, this arm may be of any form desired. In the present instance it is shown as an arrow, whereas a hand would equally serve the purpose. Fixed to the arm 19 is a pintle 20, the pintle being journalled in the housing and having secured to one end thereof a crank arm 21. At the head of the signal arm is an aperture 22 and at the rear end of the aperture is a funnel like shade 23. The small end of the shade is provided with a lamp socket for receiving an electric lamp 24. This lamp when lit illuminates both sides of the arrow. For convenience in distinguishing the front and rear of the arrow, the rear side may be colored red and the front side green. Lighting of the lamp illuminates both sides of the head of the semaphore and at night would be visible to persons in the front and the rear. The wire 25 is an electric conductor for conveying energy to the lamp, and the flow of energy may be controlled in any suitable manner.

Crank arm 21 is provided with an eye in which is secured a link 26. Secured to the link is an adjustable sleeve 27 to which a cable 28 may be attached. The sleeve provides for lengthening and shortening the line between the crank arm and actuating means for the cable. Cable 28 is secured to the sleeve and extends downwardly passing through the eye of a catch member 29. The member 29 is secured to the housing 14 at one side by means of a leaf spring 30 which tends to hold the member against the housing. Secured to the inside of member 29 is a trigger 31 best shown in Fig. 4. This trigger extends through an opening in the housing and is arranged to engage and hold the semaphore arm 19 in closed position. The cable 28 is directed in such a manner that a pull thereon tending to swing the semaphore arm will pull the catch member 29 away from the housing and the trigger 31 out of engagement with the semaphore arm, thereby releasing the latter so that it may be swung outwardly. The trigger 31 locks the semaphore arm in neutral position and preferably against a cushion strip 32 to prevent rattling. An idler pulley 33 guides the cable 28 along the housing.

A split sleeve 34 serves as a mounting for clamping a sector frame 35 to the steering column. Pivotally secured to the center of the sector is an operating arm 36. These parts are so disposed that the handle of the arm projects from under the dash board 11 at a point convenient for the driver of the vehicle to grasp the same. A catch 37$^a$ extends from the lower side of arm 36 and is arranged to engage in notches upon one side of a latch bar 38 and a catch 37$^b$ is arranged to engage in a notch on the other side. Latch 38 is pivotally mounted upon a stem 39 which serves as a mounting for pulley 40. The latch is provided with notches 41$^a$ and 42 for the catch 37$^a$ to be disposed therein and notch 41$^b$ for the catch 37$^b$. A tension spring 43 secured to the end of latch 38 and to the sector tends to hold the latter in position such that the catch 37$^a$ when moved along the latch will ride into a notch. Cable 28 has an eye 44 thereon through which the cable loosely extends, and an abutment washer 45 secures the cable to the arm 36 so that when the arm is swung inwardly, the cable will be moved by reason of the tension and is free to move in the opposite direction. This provides a one-way connection. By swinging the latch bar 38 inwardly against the action of spring 43, arm 36 will be released. The latch bar 38 is operated from a link connection 46. This connection comprises a spring wire connected to a slide frame 47 guided in a way in a collar 48 which is mounted upon the steering column. The frame 48 is provided with a follower wheel 49. The follower wheel is engaged with an annular cam 50 mounted upon the steering column just below the steering wheel 13 having a low spot 50$^a$ and high spots 50$^b$ and 50$^c$ and secured to the latter so as to be rotatable therewith. To indicate an inner, or in this specific instance, a left hand turn, the handle 36 is grasped and the arm is moved so that its catch 37$^a$ drops in the first notch 41$^a$ of the latch 38 and locks the arm in such position. The semaphore arm will then be in the position indicated by A in Fig. 3. Initial turning of the steering wheel 13 so as to make the turn causes the wheel 49 to ride upon the high part 50$^b$ of the cam thereby pushing the follower downwardly and causing the link 46 to be moved downwardly exerting a push upon the latch bar 38, and causing a movement of the latter inwardly far enough to release the arm 36 by disengaging latch 38 from catch 37$^a$. However, this movement of the latch is of such extent as to cause notch 41$^b$ on the opposite side of the latch bar to engage catch 37$^b$ and hold the arm 36 so as to retain the semaphore arm extended. There is a slight drop in the semaphore arm. When the steering wheel is returned to neutral or straight ahead position, the follower 49 drops into spot 50$^a$ on the cam and the spring 43 moves the latch bar to disengage it from catch 37$^b$. The weight of the semaphore arm is sufficient to cause the latter to drop and pull the cable 28 and arm 36 to the left or neutral position. To indicate an outer or right hand turn, the handle of arm 36 is grasped and the latter is swung to the right until catch 37$^a$ engages in notch 42. This causes the semaphore arm to be pulled into the position B as shown in Fig. 3. As the steering wheel is turned the follower 49 rides from the low part 50$^a$ to the high part 50$^c$ of the cam and causes the latch bar 38 to be moved so as to release the arm 36, but not enough for catch 37$^b$ to engage notch 41$^b$. This permits the semaphore arm to return to neutral position. If a signal has been given, and it is desired to change the same, the arm 36 is pulled upwardly, there being sufficient resiliency in its connection to permit the catches 37$^a$ and 37$^b$ on its under side to disengage from the latch bar 38, whereupon the arm will be moved to the left and the semaphore arm to neutral position.

The semaphore arm is operated to indicate a slowing down or stop, its position being that shown by C in Fig. 3. This is accomplished by a flexible element such as a chain 51 attached at the stop washer 47 to the cable 28. The end of the chain may be secured to a bell crank lever 52 mounted on the sector and by means of a spring 53 to a lever 54. Lever 54 is pivotally mounted upon a clamp collar 55 secured to the steering column. It is disposed to be engaged by the brake pedal 56 when the latter is depressed. In slowing down or making a stop, the brake pedal is depressed so as to engage the lever arm 54 and swing the latter downwardly. This causes the bell crank lever 52 to be swung and the cable 28 to be moved through the pull of chain 51. The amount of movement is limited so that the semaphore arm is swung into the position C indicating a stop. The spring 53 provides for operation of the brake pedal without moving the semaphore arm except a fixed distance. The chain 51 provides for the operation of the semaphore arm so as to indicate right and left hand turns without disturbing the stop actuating mechanism. Upon moving arm 36 to the right, there will be a slack in the chain 51.

It will be noted that the semaphore arm provides for all of the signals, and that the turn positions are operated and determined by movement of the arm 36. As soon as the wheel is swung to effect the turning of the vehicle, the semaphore arm is released. The stop actuating mechanism is controlled by the brake pedal and is uneffected by the turning mechanism. While the semaphore arm is in neutral position it is locked, and at night both sides of the semaphore arm are illuminated.

What I claim is:

1. In combination with a steerable vehicle, a device of the class described comprising the combination of a visual travel indicator for signalling a plurality of travel changes; manually operable means to selectively set said indicator for signalling any one of said travel changes; means actuable by the steering mechanism to release said indicator upon the steering mechanism being operated to turn said vehicle; and means actuable independently of and simultaneously with said steering mechanism for operating said indicator to signal a stop.

2. In combination with a steerable vehicle having a steering wheel, a device of the class described comprising the combination of a visual travel indicator for signalling a plurality of travel changes; manually operable means to selectively set and maintain said indicator for signalling any one of said travel changes; means actuable by turning of said steering wheel to release said indicator including an annular cam fixed to turn with said steering wheel and a follower riding thereon; and means actuable independently of and simultaneously with said steering mechanism for operating said indicator to signal a stop.

3. In combination with a steerable vehicle having a steering wheel, a device of the class described comprising the combination of a visual travel indicator for signalling a plurality of travel changes; manually operable means to selectively set said indicator for signalling any one of said travel changes including an arm and a latch for said arm to lock it in set position; means actuable by turning of said steering wheel to operate said latch so as to release said indicator including an annular cam to turn with said steering wheel and a follower riding thereon; and means actuable independently of and simultaneously said steering mechanism for operating said indicator to signal a stop.

4. In combination with a steerable vehicle having a steering wheel, a device of the class described comprising the combination of a visual travel indicator for signalling a plurality of travel changes; manually operable means to selectively set said indicator for signalling any one of said travel changes including a swingable arm, a latch therefor to engage and hold said arm in a selected position and movable to release the same; means actuable by turning of said steering wheel to operate said latch to release said arm; and means actuable independently of and simultaneously with said steering mechanism for operating said indicator to signal a stop.

5. In combination with a steerable vehicle having a steering wheel, a device of the class described comprising the combination of a visual travel indicator for signalling a plurality of travel changes; manually operable means to selectively set said indicator for signalling one of said travel changes including a stationary sector, a swingable arm on said sector, a latch bar for said arm extending lengthwise of the path of travel thereof for engaging and holding said arm in a selected position and being movably mounted on said sector to position the same to release said arm, resilient means tending to hold said latch bar in arm engaging position; and means actuable by turning of said steering wheel to release said indicator by moving said latch bar.

6. In combination with a steerable vehicle having a brake lever, a device of the class described comprising the combination of a visual travel indicator for signalling a plurality of travel changes; manually operable means to selectively set said indicator for signalling any one of said travel changes including a swingable arm and an operating line attached thereto by a one-way connection; and means actuable independently of said steering mechanism for operating said indicator to signal a stop including a flexible line connected to said operating line and operated by depression of said brake lever to place tension upon said flexible line and move said operating line so as to position said indicator in stop position.

7. In combination with a steerable vehicle having a brake lever, a device of the class described comprising a visual travel indicator for signalling a plurality of travel changes; manually operable means to selectively set said indicator for signalling any one of said changes including a swingable arm and an operating line attached thereto by a one-way connection, a latch for said arm to lock it in set position; means actuable by the steering mechanism to release said indicator including means for swinging said latch; and means actuable independently of and simultaneously with said steering mechanism for operating said indicator to signal a stop including a flexible line connected to said operating line and operated by depression of said brake lever to place tension in said flexible line and move said operating line so as to set said indicator in stop position.

8. In combination with a steerable vehicle having a brake operating lever, a device of the class described comprising the combination of a visual travel indicator for signalling a plurality of travel changes; manually operable means to selectively set said indicator for signalling any one of said travel changes including a stationary sector, a swingable arm mounted on said sector, a latch bar therefor extending lengthwise of the path of travel of said arm for engaging and holding said arm in a selected position and being movably mounted on said sector to release the same, and resilient means tending to hold said latch in arm engaging position; a single operating line for operating said indicator having a one-way connection to said arm, means actuable by turning of said steering wheel to release said indicator by swinging said latch into arm disengaging position; and means actuable independently of and simultaneously with said steering mechanism for operating said indicator to signal a stop including a flexible line connected to said operating line and operated by depression of said brake lever to place tension in said flexible line and move said operating line so as to position said indicator in stop condition.

9. In combination with a steerable vehicle having a brake lever and a steering wheel, a device of the class described comprising the combination of a visual travel indicator for signalling a plurality of travel changes including an operating line; manually operable means to selectively set said indicator for signalling one of said travel changes including a stationary sector, a swingable arm on said sector, a latch bar therefor extending lengthwise of the path of travel of said arm for engaging and holding the latter in a selected position and being movably mounted on said sector to release said arm, means tending to hold said latch in arm engaging position, said arm being connected to said operating line by a one way connection; means actuable by turning of said steering wheel to release said indicator including an annular cam fixed to turn with said steering wheel and a follower riding thereon and connected to said latch; and means actuable independently of said steering mechanism for operating said indicator to signal a stop including a flexible line connected to said operating line and operated by depression of said brake lever to place tension thereon and move said lines so as to position said indicator in stop condition.

10. The combination with a steerable vehicle having a brake operating lever, a device of the class described comprising a combination of a visual travel indicator for signalling a plurality of travel changes including a swingable semaphore arm and an operating line connected thereto; manually operable means to selectively set said indicator for signalling one of said travel changes including a swingable arm, a latch for said arm to lock it in set position, there being a one-way connection between said arm and said operating line; means actuable by the steering mechanism to operate said latch to release said arm upon the steering mechanism being operated to turn said vehicle; and means actuable independently of said steering mechanism for operating said indicator to signal a stop including a flexible line connected to said operating line and operated by depression of said brake lever to place tension thereon and move said lines so as to position said indicator in stop condition.

11. In combination with a steerable vehicle having a brake lever and a steering wheel, a device of the class described comprising the combination of a visual travel indicator for signalling a plurality of travel changes including a swingable semaphore arm and an operating line connected thereto; manually operable means to selectively set said indicator for signalling one of said travel changes including a stationary sector, a swingable arm mounted on said sector, a latch bar for said arm extending lengthwise of the path of travel of said arm for engaging and holding the latter in selected position and movable to release the same, resilient means tending to hold said latch bar in arm engaging position, there being a one-way connection between said operating line and said arm; means actuable by turning of said steering wheel to release said indicator including an annular cam fixed to turn with said steering wheel and a follower riding thereon and connected to said latch bar; and means actuable independently of said steering mechanism for operating said indicator to signal a stop including a flexible line connected to said operating line and operated by depression of said brake lever to place tension thereon and move said lines so as to position said indicator in stop condition.

12. In combination with a steerable vehicle, a device of the class described comprising the combination of a visual travel indicator for signalling a plurality of travel changes including a swingable semaphore arm, an operating line connected thereto, a lock for said arm when in neutral position and connected to said line so as to be operated upon said line being moved to swing said semaphore arm; manually operable means to selectively set said indicator for signalling one of said travel changes including an arm, a latch for said arm to lock it in set position; and means actuable by turning of said steering wheel to operate said latch and release said arm.

13. In combination with a steerable vehicle having a steering wheel, a device of the class described comprising the combination of a visual travel indicator for signalling a plurality of travel changes including a swingable semaphore arm, an operating line connected thereto, a trigger for locking said arm in neutral position, spring means for holding said trigger in locking position, said operating line being rove through said trigger so that upon tension being placed upon said line, said trigger will be retracted from locking position; and manually operable means to selectively set said indicator by pulling upon said line.

In witness that I claim the foregoing I have hereunto subscribed my name this 3rd day of June, 1926.

WALTER L. FOSTER.